(12) United States Patent
Poovey

(10) Patent No.: US 7,072,536 B2
(45) Date of Patent: Jul. 4, 2006

(54) LIGHT TRIGGERED LIGHT SWITCH

(75) Inventor: Gary Neal Poovey, 28557 Lemon Ave., Escalon, CA (US) 95320

(73) Assignee: Gary Neal Poovey, Escalon, CA (US)

( * ) Notice: Subject to any disclaimer, the term of this patent is extended or adjusted under 35 U.S.C. 154(b) by 0 days.

(21) Appl. No.: 10/732,857

(22) Filed: Dec. 11, 2003

(65) Prior Publication Data

US 2005/0129351 A1 Jun. 16, 2005

(51) Int. Cl.
*G02B 6/26* (2006.01)

(52) U.S. Cl. .............................. 385/15; 385/16; 385/13; 385/43; 385/901; 385/14

(58) Field of Classification Search ................... 385/15, 385/16, 17, 18, 24, 49, 42, 43, 12, 13, 14, 385/901

See application file for complete search history.

(56) References Cited

U.S. PATENT DOCUMENTS

| 5,425,115 | A | * | 6/1995 | Wagner ........................ 385/16 |
| 5,703,975 | A | | 12/1997 | Miller et al. |
| 6,075,512 | A | * | 6/2000 | Patel et al. .................. 345/101 |
| 6,178,033 | B1 | * | 1/2001 | Ford et al. ................... 359/247 |
| 6,320,994 | B1 | * | 11/2001 | Donald et al. ................ 385/16 |
| 6,487,333 | B1 | * | 11/2002 | Fouquet et al. ............... 385/18 |
| 6,594,411 | B1 | | 7/2003 | Chung |
| 6,697,548 | B1 | * | 2/2004 | LoCascio et al. ............. 385/16 |
| 6,757,459 | B1 | * | 6/2004 | Troll ........................... 385/18 |
| 6,804,427 | B1 | * | 10/2004 | Tabata ......................... 385/16 |
| 2004/0037708 | A1 | * | 2/2004 | Murasato et al. ............. 417/99 |
| 2004/0091201 | A1 | * | 5/2004 | Divoux et al. ................ 385/18 |

\* cited by examiner

*Primary Examiner*—Brian M. Healy

(57) ABSTRACT

A light switch is disclosed to turn on or off the light signal in a light channel by means of the response of piezoelectric material to the electric field of light in the light channel. The LIGHT TRIGGERED LIGHT SWITCH is a light switch that is actuated by light of sufficient power. Light of different frequencies may travel in a light channel together without hindering each other, as long as the channel is the right size for both frequencies of light. The light that actuates the switch may be a different frequency than the light signal that is switched on or off. Fiber optic communication channels are among the channels that these switches may be used for.

14 Claims, 3 Drawing Sheets

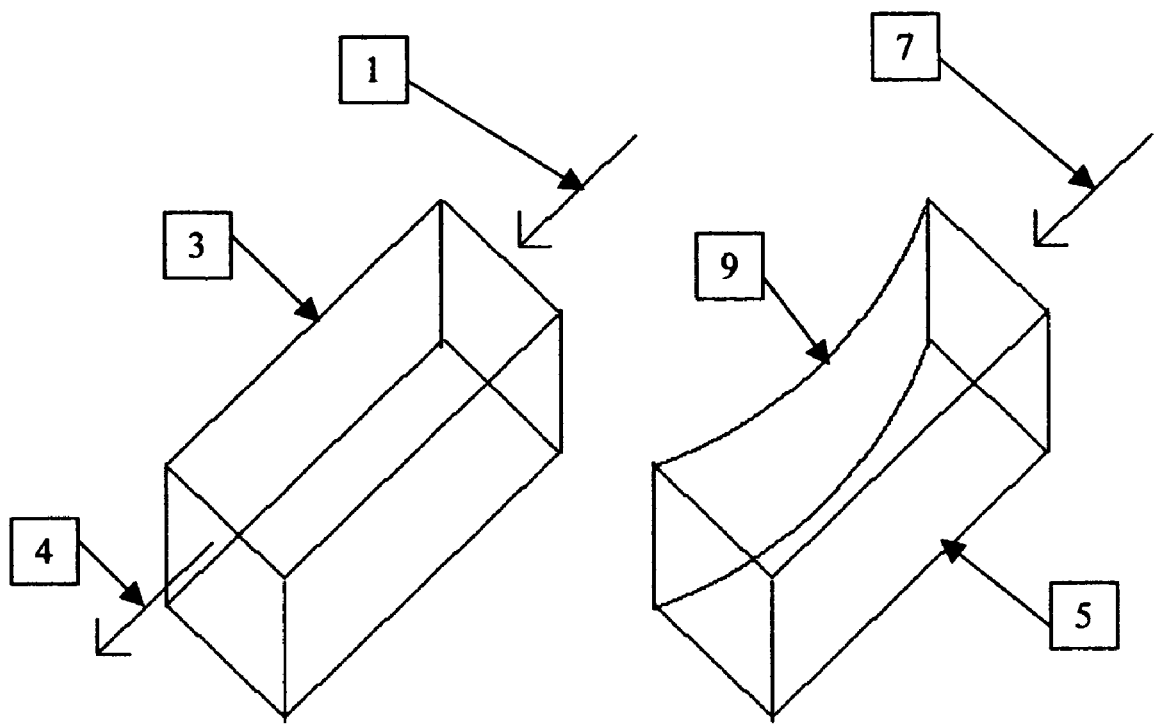
Figure 1A                    Figure 1B

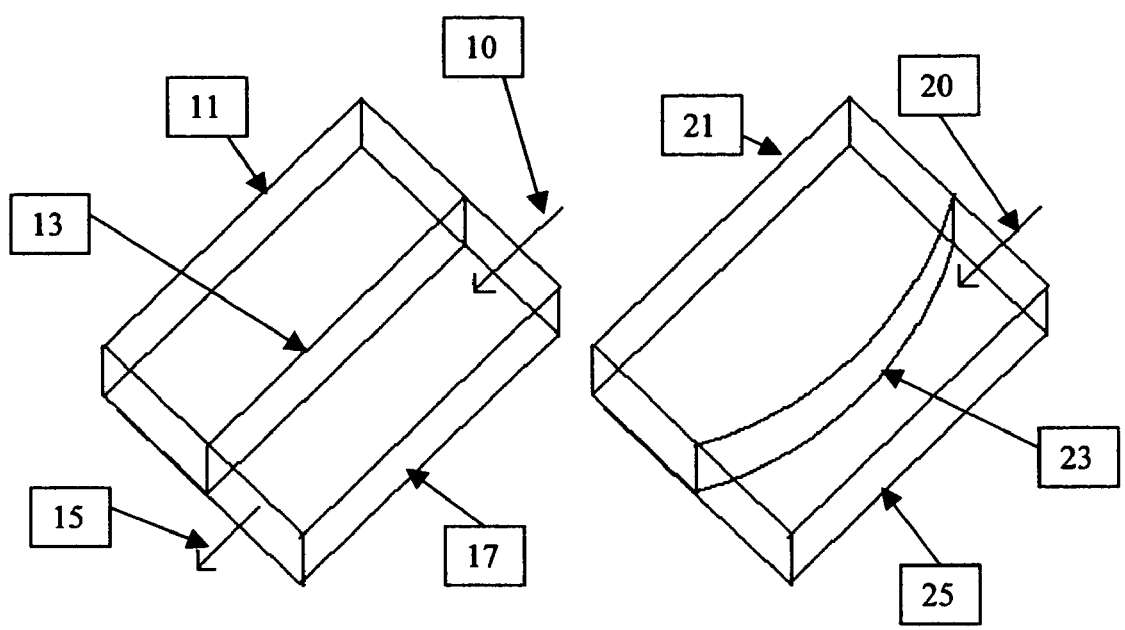
Figure 2A                    Figure 2B

LIGHT TRIGGERED LIGHT SWITCH

BACKGROUND OF THE INVENTION

1. Field of the Invention

This invention relates to a method for switching light signals in an optical wave-guide on or off at speeds faster than $101^{-11}$" seconds using light to trigger the switch.

2. Description of the Prior Art

As technology advances communication of three-dimensional drawings, video, and software applications require more information to be communicated faster than ever. Fiber optical channels can handle much more information than wires can. The slowest part of a fiber optic communication channel at present are the fiber optic switching devices. At present fiber optic signals are switched using various methods that are actuated by transistors. One device pictured in trade journals is based on an array of mirrors. U.S. Pat. No. 6,178,033 issued Jan. 23, 2001, which teaches MICROMECHANICAL MEMBRANE TILT-MIRROR SWITCH, and is issued to Joseph Ford et al. is an example of this kind of device. The mirrors are tilted to switch the optical signal from on to off or off to on. The tilting of the switch is actuated by circuits that use transistors, and so are bound to $10^{-9}$ seconds speeds at the best. The U.S. Pat. No. 6,594,411, which teaches OPTICAL SWITCH, and is issued to Yueh Liang Chung et al. on Jul. 15 of 2003, makes mention of a piezoelectric element. The piezoelectric element is actuated by an electrical signal, which is again bound to the $10^{-9}$ seconds speeds that transistors can accomplish. The U.S. Pat. No. 5,703,975 that teaches INTERFEROMETRIC SWITCH patented by William Miller etal. on Dec. 30, 1997 might be faster, but they are physically long for the present need for miniaturized components. The components are more than a centimeter in length in William Miller's device. To meet the demands that technical advances require optical switches need to be a few micrometers in length.

SUMMARY OF THE INVENTION

The LIGHT TRIGGERED LIGHT SWITCH uses the inability of electromagnetic waves to travel through a channel that is dimensionally smaller than the wave length to turn light off the light signal in a fiber optical channel. Opening up the fiber optical channel to a dimension large enough allows the LIGHT TRIGGERED LIGHT SWITCH to turn on the signal in an optical channel. The LIGHT TRIGGERED LIGHT SWITCH uses dimensional changes of piezoelectric materials in an electric field to effect the closing or opening of fiber optical channels. The electric field of light in the channel is the electric field that effects the change in the piezoelectric material. LIGHT TRIGGERED LIGHT SWITCHES can switch faster than $10^{-11}$ seconds. This is 100 times faster than the TILT-MIRROR SWITCH, OPTICAL SWITCH, or any transistor-actuated switch can respond since they can be no faster than $10^{-9}$ seconds. LIGHT TRIGGERED LIGHT SWITCHES can be made smaller than 30 microns in length, less than one micron in width, and height depending on the specific wavelength to be used in the fiber optic channel. Millions of switches this size can be put in the space of one INTERFEROMETRIC SWITCH discussed above. The LIGHT TRIGGERED LIGHT SWITCHES will also be 100 times or more fast than the INTERFEROMETRIC SWITCH. Fiber optic communication will be made 100 or more times faster using the LIGHT TRIGGERED LIGHT SWITCH and components will be able to be made the size of computer chip components. The amount of information that can be transmitted across a fiber optic channel is far greater than can be transmitted across a normal telephone wire. Society needs fast communication of sound pictures and video signals. Currently the switching of these communication signals is limited by the speed of the transistor, which actuate at about $10^{-9}$ seconds. For society to achieve fast switching of signals the LIGHT TRIGGERED LIGHT SWITCH is necessary.

BRIEF DESCRIPTION OF THE DRAWINGS

FIG. 1A and B pictures the transparent piezoelectric LIGHT TRIGGERED LIGHT SWITCH. The transparent piezoelectric material in this switch responds to the electric field of the light passing through it to switch the light signal on or off. FIG. 1A is the switch in the on position, and FIG. 1B is the switch in the off position. The light that throws the switch does not need to be the same wavelength as the light that is caring the signal to be turned off.

FIGS. 2A and B pictures the sidewall LIGHT TRIGGERED LIGHT SWITCH. This switch is comprised of two parallel pieces of material with a common wall of piezoelectric material. The electric field of the light passing through the channel causes the piezoelectric material of the wall to bend and shut off the channel carrying the light. The wall that moves makes the dimensions too small for the light carrying the signal to pass through. FIG. 2A is the switch pictured in the on position, and FIG. 2B is the switch pictured in the off position.

FIG. 3A is the switch pictured in the on position.

DETAILED DESCRIPTION OF THE INVENTION

Figures 3A, 3B:
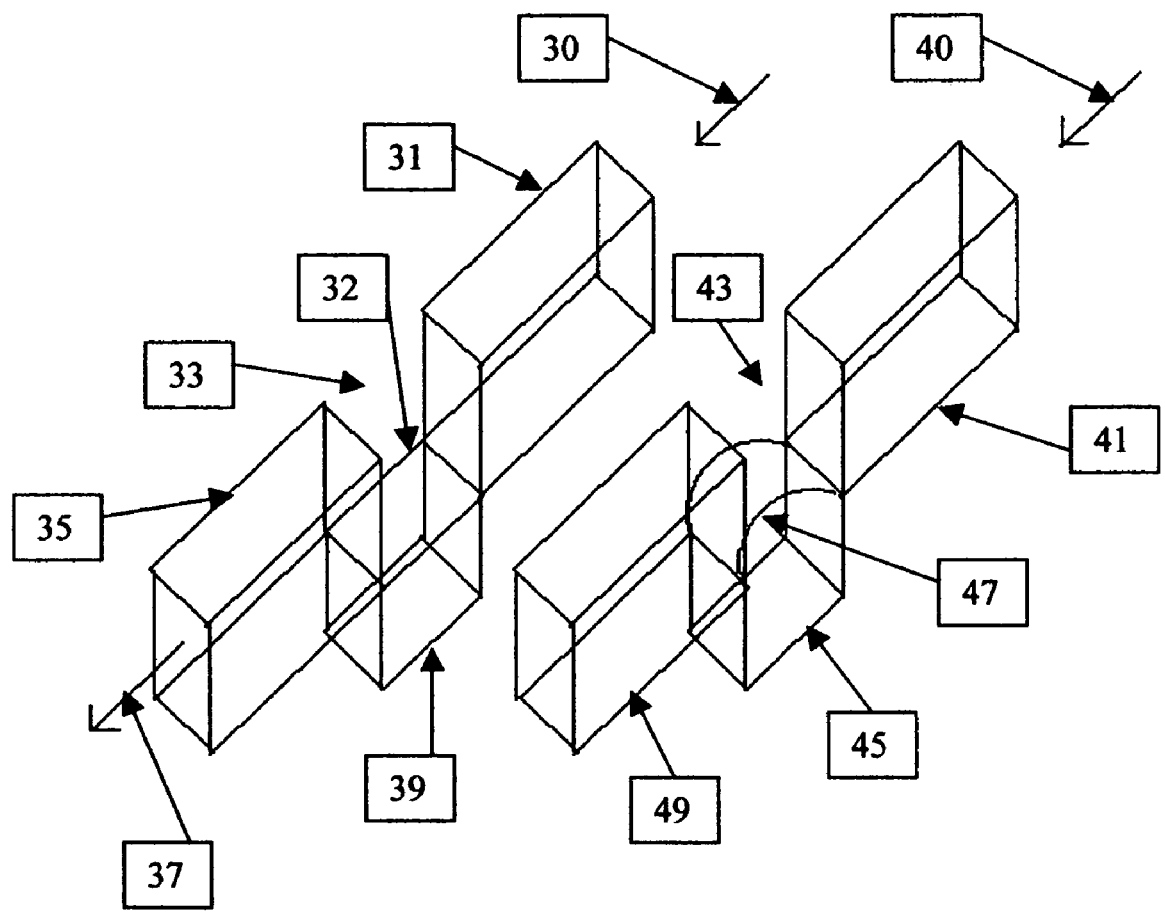
FIGS. 3A and B pictures the compressible fluid LIGHT TRIGGERED LIGHT SWITCH. The particular compressible fluid might be most conveniently filled with a gas. Argon, nitrogen, a petroleum distillate or air could be the compressible fluid. The piezoelectric material at the bottom of the compressible fluid portion of the LIGHT TRIGGERED LIGHT SWITCH responds to the light passing through the channel and compresses the compressible fluid. The compressible fluid portion of the channel is compressed to dimensions that are too small, preventing the light signal from continuing through the channel.
FIG. 3B is the switch pictured in the off position.

The LIGHT TRIGGERED LIGHT SWITCH uses the characteristic of piezoelectric material that the dimensions of the piezoelectric material change when it is influenced by an electric field. The electric field of light in a channel is the electric field that the piezoelectric material responds to in the LIGHT TRIGGERED LIGHT SWITCH here described. Light channels will be made larger or smaller as the piezoelectric material changes dimensions in response to the influence of the electric field of the light passing through the channel. When a light channel is opened up from being too small to allow light signals to pass though them by the response of the piezoelectric material to the electric field of light passing through the channel, the switch is on. When the channel is made small enough light signals of certain wavelengths will no longer pass through the smaller channel. When the light signals will not pass through the light channel that has been made smaller, the signal is switched off. Some piezoelectric materials have a crystal orientation that must be aligned with the electric field that will cause it to change shape. Other piezoelectric materials can be heated up in a magnetic field and oriented to respond in the desired direction to the electric field that will be applied. In constructing these LIGHT TRIGGERED LIGHT SWITCHES, the orientation of the crystal or the magnetic orientation of the piezoelectric material must be directed to have the maximum dimensional change at right angles (that is perpendicular) to the direction of the light in the light channel to be switched. The electric field that will be causing the switching will be at right angles (that is perpendicular) to the path of the light in the light channel. Examples of crystalline piezoelectric materials are quartz ($SiO_2$), lithium niobate ($LiNbO_3$), lead zirconate ($PbZrO_3$), lead titanate ($PbTiO_3$), and lead zirconate titanate. Lead zirconate titanate is also called PZT. Examples of piezoelectric materials that can be oriented in a magnetic field are lead zirconate and lead titanate or lead zicronate titanate. Quartz and lithium niobate are transparent piezoelectric materials. An example of the desired interaction follows. The electric field in volts needed to actuate a switch will be calculated using the power in watts of the light in the channel. The Poynting vector equation which is written $E=(2\mu_o c p)^{1/2}$ will be used to make this calculation. Where $\mu_o$ is 4 pi×$10^{-7}$ Weber/amp-meter and c is 3×$10^8$ meters/second. Using this relation it is found that the voltage developed by a 150-milliwatt signal in a fourth of a micron channel is 10 volts. This voltage will be employed to actuate the LIGHT TRIGGERED LIGHT SWITCH turning on or off the signals in a fiber optic channel. The voltage the light develops will change the dimensions of the 2065 Å channel by 40 Å when lead zecronate titnate is used. Lead zecronate titonate has a piezoelectric strain coefficient of 3.90×$10^{-10}$ meters/volt. 818 nm light (8180 Å), commonly used for fiber optics, will be able to travel in a channel just bigger than 2045 Å and will not travel down a channel smaller. When the 2065 Å channel changes to 2014 Å the light will be shut off. Light of 8056 Å wavelength or shorter could still pass through the switch. The drawings further clarify the invention. In FIG. 1A, arrow 1 indicates the light passing into the LIGHT TRIGGERED LIGHT SWITCH. Rectangular solid 3 is the transparent piezoelectric material of the switch. The piezoelectric material is not being acted upon by the electric field of a switching light signal that is of sufficient power to cause the piezoelectric material to change. Arrow 4 is the light passing out of the open LIGHT TRIGGERED LIGHT SWITCH. The switch is in the on condition. In FIG. 1B, arrow 7 indicates the light passing into the LIGHT TRIGGERED LIGHT SWITCH. Rectangular solid 5 is the transparent piezoelectric material of the switch. Curved side 9 indicates the curve of the side of the transparent piezoelectric material as it responds to the electric field of the light that is causing the LIGHT TRIGGERED LIGHT SWITCH to turn off by constricting the path of the light below the cut off frequency for the signal. The electric field that is high enough voltage to cause this response is of light that is of sufficient power. It will be noted that now there is no arrow indicating the light passing out of the LIGHT TRIGGERED LIGHT SWITCH. This switch is in the off condition. The light signal does not pass through it. The light that actuates the switch may be of the same frequency as the light of the signal that is turned on or off. It is the power of the light that actuates the switch. The light that actuates the switch may be of smaller wavelength than the light signal that is turned on or off. In this case the light that actuates the signal may continue to pass through the switch while the light signal is prevented from passing. In FIG. 2A, arrow 10 indicates light passing into the switch. Rectangular solid 11 is the piezoelectric material that may be opaque or transparent. Plane 13 is the interface between the light channel and the piezoelectric material. The interface is flat because it is not being acted upon by the electric field of a light signal of sufficient power to cause the material to respond. Rectangular solid 17 is the light channel of the switch. Arrow 15 is indicating the light passing through the LIGHT TRIGGERED LIGHT SWITCH. The switch is in the on condition. In FIG. 2B, arrow 20 that indicates the light passing into the LIGHT TRIGGERED LIGHT SWITCH. Rectangular solid 21 is the piezoelectric material of the switch that can be opaque or transparent. Curved plane 23 is the interface between the piezoelectric material and the light channel of the LIGHT TRIGGERED LIGHT SWITCH. Curved plane 23 is bent in response to the electric field of the appropriate switching light passing through the switch. Rectangular solid 25 is the light channel of the switch that is closed down to dimensions that are below the cut off frequency of the light signal that was entering the switch. It will be noticed that there is no arrow indicating that the light signal is passing through the LIGHT TRIGGERED LIGHT SWITCH. This switch is in the off state. In FIG. 3A, arrow 30 is the light signal passing into the LIGHT TRIGGERED LIGHT SWITCH. Rectangular solid 31 is the first part of the light channel in the LIGHT TRIGGERED LIGHT SWITCH. Rectangular solid 31 will be a solid transparent material. Space 33 is the middle section of the LIGHT TRIGGERED LIGHT SWITCH which is filled with a fluid material like air. Plane 32 is the interface between the piezoelectric material of the switch 39 and the middle space 33 of the LIGHT TRIGGERED LIGHT SWITCH. The interface is flat and not being acted upon by the electric field of a switching light that would change the piezoelectric material. Rectangular solid 35 is the final section of the light channel in the LIGHT TRIGGERED LIGHT SWITCH. Rectangular solid 35 will be composed of a transparent material. Arrow 37 is indicating the light signal passing through the switch. The switch is in an on condition in FIG. 3A. In FIG. 3B, arrow 40 indicates a light signal entering the first part of the LIGHT TRIGGERED LIGHT SWITCH. Rectangular solid 41 is the first part of the light channel of the LIGHT TRIGGERED LIGHT SWITCH. Rectangular solid 41 will be a solid transparent material. Space 43 is the middle part of the light channel of the LIGHT TRIGGERED LIGHT SWITCH. Space 43 is filled with a fluid material like air, petroleum products or other compressible fluid. Curved plane 47 is the interface between the piezoelectric part of the LIGHT TRIGGERED LIGHT SWITCH and the transparent fluid part of the LIGHT TRIGGERED LIGHT SWITCH. Curved plane 47 is curved up into space 43, and the light signal will not pass through the switch because the dimensions of the channel are too small. Rectangular solid 45 is the piezoelectric material of the LIGHT TRIGGERED LIGHT SWITCH which in this case is responding to the electric field of a light that is causing the switch to be turned off. Rectangular solid 49 is the last part of the light channel of the LIGHT TRIGGERED LIGHT SWITCH in FIG. 3B. Rectangular solid 49 will be composed of a solid transparent material. It will be noticed that there is no arrow indicting that the light passes through the LIGHT TRIGGERED LIGHT SWITCH in this drawing. The switch in FIG. 3B is in an off condition. The three drawings of the Light Toggled Light Switches are schematic drawings. In actual switches, additional layers of material will be used to secure, cover, and align the fiber optic switches in a fiber optic assembly.

What I claim as my invention is:

1. An on and off switch for light in a channel comprising a transparent piezoelectric light channel that is made A. larger in cross section by the action of the electric field of light passing through the channel there by opening to the passage of the light signals for the switch to be in the on condition B. smaller in cross section by the action of the electric field of light passing through the channel there by closing to the passage of the light signals for the switch to be in the off condition.

2. An on and off switch for light in a channel comprising a channel next to a piece of piezoelectric material where the channel carrying the light is made A. larger in cross section by the action of the electric field of the light in the channel on the piece of piezoelectric material that by contracting opens the light carrying channel to light signals causing the on condition B. smaller in cross section by the action of the electric field of the light in the channel on the piece of piezoelectric material that by expanding into the light carrying channel closes the light channel to light signals causing the off condition.

3. An on and off switch for light signals in a channel comprising a compressible fluid portion of the channel with a side that is composed of a piezoelectric material that responds to the electric field in the light in the channel to A. Contract the piezoelectric wall of the channel to open up the channel to larger dimensions so that the light signal easily passes through the channel causing the on condition.

B. Expanding into the light channel to close the light channel to smaller dimensions so that the light signal may not pass. through the channel causing the off condition.

4. A light switch as claimed in claims one, two, or three that is actuated by the power of the switching light, which is the same wavelength as the light signal in the channel that is switched on and off.

5. A light switch as claimed in claims one, two, or three that is actuated by the power of the switching light, which is a shorter wavelength than the light signal in the channel that is switched on and off.

6. A light switch as claimed in claims one, two, or three that is actuated by the power of the switching light, which is a longer wavelength than the light signal via the channel that is switched en and off.

7. A light switch for light signals as claimed in claim one where the piezoelectric material is transparent to the light passing through it.

8. A light switch for light signals as claimed in claim three where the compressible fluid is a gas.

9. A light switch to, light signals as claimed in claim three where the compressible fluid is a mixture of gases.

10. A light, switch for light signals as claimed in claim three where the compressible fluid is a liquid.

11. A light switch for light signals as claimed in claim three where the compressible fluid is a mixture of liquids.

12. A light switch for light signals as claimed in claims two-three were more than one wall of the switch is piezoelectric material that responds to the power of the light in the channel turning the switch on and off.

13. A light switch for light signals as claimed in claims one, two or three where the piezoelectric material responds to the power level of the light in the channel turning the switch on and off.

14. A light switch for light signals as claimed in claims one, two, or three where the light that accomplishes the switching of the light signal in the channel is imposed upon a conductor near the light channel with the signal that is switched in it.

\* \* \* \* \*